Figure 1:
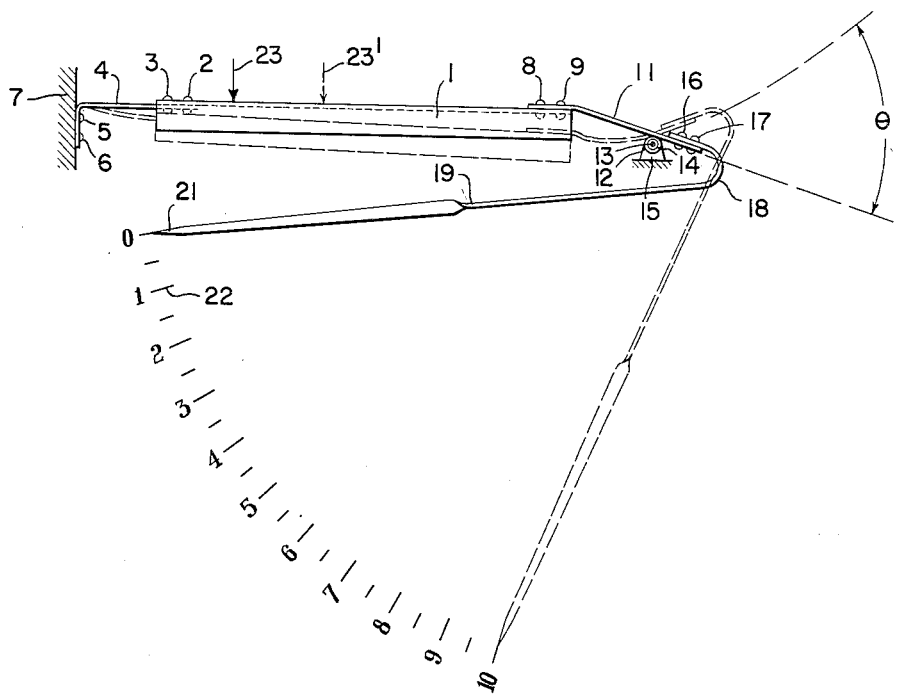

June 13, 1961  R. C. WHITEHEAD, JR  2,987,913
POINTER MECHANISM IMPROVEMENTS
Filed Feb. 8, 1956

*INVENTOR.*
ROBERT C. WHITEHEAD JR.
BY
ATTORNEY.

United States Patent Office 2,987,913
Patented June 13, 1961

2,987,913
POINTER MECHANISM IMPROVEMENTS
Robert C. Whitehead, Jr., Oreland, Pa., assignor to Minneapolis-Honeywell Regulator Company, Minneapolis, Minn., a corporation of Delaware
Filed Feb. 8, 1956, Ser. No. 564,205
14 Claims. (Cl. 73—141)

The present invention relates to pointer mechanisms for measuring and indicating the magnitude of a variable.

Such pointer mechanisms have heretofore employed pinions in mesh with gear segments and other similar mechanisms to obtain large incremental motion across an indicating dial for each change in the magnitude of a variable being measured. It is the object of the present invention to substitute a greatly simplified spring actuating mechanism for performing such a pointer actuating function.

More particularly, the present invention comprises a novel spring actuating mechanism for transducing the magnitude of the force applied to a beam into the motion of a pointer that is actuated in an arcuate path across a force indicating scale.

My invention is characterized in particular by the fact that the novel, simple, and effective spring actuating mechanism which I have devised is used to greatly amplify the deflection of a pointer for each incremental change in the deflecting force applied to the aforementioned beam. A more specific object of the present invention is thus to provide a mechanism which will directly transduce small incremental change in the magnitude of a force, that is applied to a beam, into large proportional arcuate movements of a pointer of an indicating instrument.

The various features of novelty which characterize my invention are pointed out with particularity in the claims annexed to and forming a part of this specification. For a better understanding of the invention, however, its advantages, and specific objects attained with its use, reference should be had to the accompanying drawings and descriptive matter in which I have illustrated and described preferred embodiments of the invention.

Figure 2:
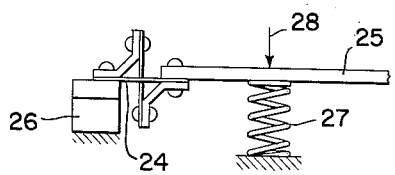

In the drawings:

FIG. 1 illustrates one embodiment of the present invention in which the high gradient leaf spring is used to connect the aforementioned beam and spring actuating mechanism to a support member; and FIG. 2 illustrates a second embodiment of the invention in which a flexible pivot and a compressing spring have been substituted for the high gradient leaf spring shown in FIG. 1.

The pointer actuating mechanism of the present invention comprises a rigid beam 1 having a left end portion rigidly connected by means of rivets 2, 3 to a high gradient angularly shaped beryllium copper or stainless steel leaf spring 4. As shown in FIGURE 1, this leaf spring 4 in turn is fixedly attached by means of rivets 5, 6 to a stationary support member 7. The right end of the beam 1 of this pointer actuating mechanism is attached by means of rivets 8, 9 to a low gradient angularly displaced very flexible beryllium copper leaf spring 11. The lower surface of the central portion of this flexible leaf spring 11 is shown in loose contact with a cylinder 12. A central shaft 13 protrudes from an is fixedly attached to this cylinder 12. This shaft 13 is in turn rotatably supported in bearing 14 of a fixedly positioned support member 15.

While not shown in the drawings, in certain applications of the present invention it might well be economically feasible to make this previously mentioned fixedly supported cylinder of a non-rotatable type rather than a rotatable type, without departing from the spirit of the invention, as the same type of pointer motion would occur in either case.

While FIGURE 1 of the drawing illustrates the flexible spring supporting surface 12 as being of a round cylindrical shape, it is noted that this surface might well be, for example, made in the form of a knife-edge shape or a sphere. If desired, it may be made of a resilient material, in which case the support 12 may be permanently attached both to the flexible spring member 11 and to the supporting surface 15. The only necessary requirement for the aformentioned supporting member is that longitudinal movement of the flexible spring 11 is permitted while supported on such a surface when a force is applied to the spring 11 to move the spring in a downward direction.

The right end of the leaf spring 11 is attached by a suitable connecting means such as rivets 16, 17 to a rigid pointer element 18. This pointer element has an extended portion 19 that is substantially parallel to the beam 1 and also a pointed portion 21. An indicating scale 22 is shown, over which the pointed portion 21 of the pointer may be moved when a force such as that represented by the arrow 23 is applied to the beam 1.

FIG. 1 also shows an angle θ through which the flexible leaf spring 11 will be forced to move when the pointer is moved from its zero or minimum indicating scale position to its numeral ten or maximum indicating scale position.

In the operation of this pointer mechanism, when a force 23 of a given magnitude is applied to the beam 1, it will cause the beam to be moved away from its solid line position toward its dotted line position. The extent to which the beam will be laterally displaced in this manner will depend on the magnitude of the force 23 that is being applied and the amount of resistance to downward motion that is offered by the high gradient leaf spring 4.

As an input force 23 of this magnitude acts on the beam 1 the lower surface portion of the low gradient leaf spring element 11 will be moved downwardly against and longitudinally along the upper surface of the cylinder 12. This action causes the lower outermost portion of the spring 11 to be moved in a counter-clockwise manner about the axis of the cylinder 12. As this counter-clockwise movement occurs the extended and pointed portions of the pointer 19, 21 which are rigidly connected to spring 11 are also caused to move in the same counter-clockwise direction. As this movement of the inner end of this pointer takes place it will cause the pointer portion 21 to be moved over the fixed force indicating scale 22 from a zero scale position to a scale position which is directly related to the magnitude of the input force 23 that is being applied to the beam 1.

As the force 23 applied to the beam 1 is increased, the pointers 18, 19, 21 will continue to move upscale toward the dotted line position shown in FIG. 1. If, on the other hand, the force 23 being applied to the beam 1 is decreased, the downward force being applied to the cylinder 12 will also be reduced. This latter action will then permit the spring 11 to flex itself in a direction toward its straight line position.

There is also shown in FIG. 1 a dotted arrow 23'. This dotted arrow head 23' is placed on the drawing to show one of the many positions to which the input force 23 may be applied to the beam. Since, in this example, the dotted force arrow 23' is shown located at a greater distance from the stationary member 7 than the solid arrow head 23 the input force 23' will apply a greater bending action to the beam for each increment of force than it would if this force were applied at the solid arrow position 23. On the other hand, if such input force 23 were moved to the left of the solid arrow position the aforementioned bending action of the beam 1 would be decreased.

By suitably adjusting the input force 23 to a desired beam 1 position it will enable the operator of such a leaf spring pointer mechanism to obtain the bending action he desires for a given input force. As previously noted, this beam bending action is amplified many fold into motion of a pointer 18, 19, 21 moving across an indicating scale 22. The adjustment of the position at which the input force 23 is applied to the beam 1 will thus vary the degree of pointer motion for any predetermined force applied to the beam.

With this arrangement an operator need only select any one of a number of indicating scales which are of different lengths over which he desires his pointer parts 18, 19, 21 to traverse and then adjust the position of the input force 23 along the beam to a position that will enable the pointed portion 21 of the pointer to travel, for example, from a zero scale position to the maximum scale position or position marked ten on the selected indicating scale. While it is common in the pointer indicating art to provide span adjusting apparatus, heretofore, such a simple leaf spring pointer mechanism has not been available which can obtain such large incremental changes in pointer movement for each minute change in a force 23 being transmitted thereto.

The apparatus just described may take other forms. Thus, for example, in lieu of making the spring 4 which connects the beam 1 to the support 7 of a high gradient metal strip material this spring may well be replaced by one using instead of flexible pivot 24 that connects a beam 25 to a support 26 and a compression spring 27 as is shown in FIG. 2 of the drawing. In this case the compression spring that is used is placed directly under the beam where the input as indicated by the arrow 28 is being applied. The flexible pivot 24 in FIG. 2 permits the beam 25 to be moved in substantially the same lateral manner when a force 28 is applied to the beam as was previously set forth under the description of the operation of the force 23 acting on the beam 1 of the pointer indicating mechanism of FIG. 1.

In FIG. 2 the coil spring 27 is shown in a predetermined compressed state and exerting a desired upward force on the underside of the beam 25. Thi coil spring thus offers a predetermined desired amount of resistance to any increase in the input force 28 that is being applied in a downward direction to the upper surface of the beam 25. It can thus be seen that the spring 27 of FIG. 2 applies an upward force to the beam 25 in a manner similar to the way the high gradient leaf spring 4 offers resistance to any downward motion of the beam 1 when the input force 23 of FIG. 1 is applied to the beam 1.

The chief purpose which either a high gradient leaf spring 4 as shown in FIG. 1 or the flexible pivot 24 and compression spring 27 serve, is, that they act as a calibrating spring for the input force that is being applied to the rigid beam.

Experimentation has shown that the use of the low gradient spring 11 in a pointer mechanism of this type makes it possible for the user of such a mechanism to obtain much larger pointer amplification of an input force applied to the beam than is possible when pointer mechanisms other than those employing gears or some complicated lever system are employed. Experimentation has further also shown that by using a six inch pointer of the type disclosed in this application that high ratios of approximately thirty to one are possible. The use of either of the two types of leaf spring pointer mechanism disclosed in this specification thus great simplifies the number of parts that are required to indicate the magnitude of an input force acting on a beam.

Since the leaf spring pointer mechanism of the present invention does not require any conventional gear and gear segments to obtain such a large change in pointer movement and merely requires that a leaf spring 11 be angularly positioned on a rotatable roller 12, this invention not only greatly reduces the complexity of the parts required by such a pointer actuating mechanism but also provides such a mechanism with an unusually high pointer amplification as has heretofore been pointed out.

While, in accordance with the provisions of the statutes, I have illustrated and described the best forms of embodiment of my invention now known to me, it will be apparent to those skilled in the art that changes may be made in the forms of the apparatus disclosed without departing from the spirit of my invention as set forth in the appended claims and that in some cases certain features of my invention may be used to advantage without a corresponding use of other features.

Having now described my invention, what I claim as new and desire to secure by Letters Patent is:

1. In combination, a laterally movable beam, means including a bendable element having one end rigidly connected to said beam, a roller in engagement with said bendable element on which said element is bent as a force on said beam acts to move said beam in a lateral direction relative to the central axes of said roller, a beam force indicating pointer connected to a portion of said bendable element at a location remote from said roller and at an acute angle thereto and said bending action of said bendable element acting to transduce the magnitude of said force acting on said beam into an arcuate indicator pointer motion that is proportional to the magnitude of said force.

2. An indicator pointer actuating apparatus comprising, a roller, a means for rotatably supporting the axes of said roller in a fixed position, a flexible leaf spring having a longitudinal surface in loose contact with the outer peripheral surface of said roller, a force applying means operably connected to one elongated end of said leaf spring to vary the amount to which said longitudinal surface is depressed and rolled over the peripheral surface of said roller in accordance with the magnitude of a variable, a pointer fixedly connected at its non-indicating end to the end of said leaf spring that is opposite said elongated end and an arcuate indicating scale over which the indicating end of said pointer is forced to travel by said depressing and rolling action of said spring.

3. In combination, a laterally movable beam, a pointer movable along a curved path, a bendable element directly fixedly connected at one end with said beam and at its other end with said pointer, a roller in engagement with said element and said bendable element being operative to move said pointer away from said beam and toward one end of said path as said beam is moved toward a predetermined lateral position and said element is moved against said roller.

4. In combination, a laterally moveable beam, an indicating pointer that is operable to move along a curved path, a resilient means directly connecting said beam and pointer in angular relationship with one another, said resilient means being positioned on a rotatable roller and said resilient means being operative to move said pointer away from one end and toward the other end of said path as said beam is moved away from a first predetermined position toward a second predetermined position and said resilient means is depressed against a stationary cylindrical surface of said roller.

5. Apparatus as specified in claim 4 in which said resilient means is forced into an arcuate shape by said cylindrical surface of said roller during movement of said beam between its two positions.

6. In combination, a laterally moveable beam, an indicating pointer that is operably positioned to move along a curved path between two instrument scale positions, an angularly positioned resilient spring plate fixedly connected at one end to said beam and at its other end to said pointer, a roller against which a part between the end portions of said plate is depressed and said depressed part of said plate acting to progressively and uniformly amplify said pointer movement in accordance with the magnitude of a force applied to said beam.

7. Apparatus as specified in claim 6 in which said portion between the said ends of said resilient plate is forced to move against and along said roller into an arcuate shape during the application of said force to said beam.

8. In combination, an elongated transversely moveable beam forming one portion of a pointer mechanism, a support member, a flexible pivot operably positioned to support one end of said beam on said support member, a compression spring operably connected to said beam to bias it toward a predetermined position, a leaf spring having a central portion in engagement with a rotatable roller, said leaf spring forming another portion of said mechanism and having one end portion fixedly connected to and extending away from another opposite end of said beam, a reversely extending non-resilient pointer forming an additional portion of said mechanism fixedly connected to the unattached end of said leaf spring and extending alongside of said beam and a scale along which the free end of said pointer is deflectable in response to a movement of the beam in a direction transverse to the length of said beam and as said central portion of said leaf spring is simultaneously brought into rolling contact with said roller.

9. Apparatus as specified in claim 8 in which the rotatable roller has an axis which is rotatably fixed relative to said predetermined position of said beam.

10. Apparatus as specified in claim 8 in which the rotatable roller has an axis which is rotatably fixed relative to said predetermined position of said beam and about which axis said leaf spring is angularly displaced with respect to said beam and pointer when said beam is in said predetermined position and said leaf spring is forced downwardly against and in sliding contact with said rotatable roller as said movement of said beam occurs.

11. A means to transduce small incremental increases in the magnitude of an input force acting on a beam into a large uniform arcuate travel of an indicating pointer, comprising a first leaf spring of a substantially high gradient connected at one end to said beam and at its other end to a support member, a second leaf spring of a lower gradient than the said first spring fixedly connected at one end to a non-indicating end portion of said pointer and at its other end to the other end of said beam, said second spring being angularly positioned with respect to said beam and said non-indicating end and a roller on which a central portion of said second spring can roll and bend as said magnitude of said input force is altered.

12. A force to arcuate motion transducing means, comprising a beam actuated in a lateral direction by said force, a flexible leaf spring having one end operatively connected to move with said beam, a roller over which a portion of said spring is caused to roll and bend when said beam is moved in said lateral direction, a rigid pointer fixedly connected at one end to the other end of said spring and the other end of said pointer being positioned to operatively move across an indicating scale in an arcuate fashion during said rolling and bending action of said leaf spring on said roller.

13. Apparatus as specified in claim 12 in which an incremental increase or decrease in force applied to said beam will result in a uniform incremental arcuate movement of said other end of said pointer across said indicating scale.

14. In combination, a laterally moveable beam, a pointer operative to move along a curved path and a resilient means fixedly connecting an end of said beam directly with said pointer and operative to move said pointer away from one end and toward the other end of said path as said beam is moved away from a first predetermined position toward a second predetermined position and said resilient means is depressed against a supporting surface of a roller.

References Cited in the file of this patent

UNITED STATES PATENTS

| | | |
|---|---|---|
| 2,305,731 | Palmgren | Dec. 22, 1942 |
| 2,382,289 | Burt | Aug. 14, 1945 |
| 2,476,941 | Woodward | July 19, 1949 |
| 2,613,530 | Nichols | Oct. 14, 1952 |
| 2,687,642 | Livermont | Aug. 31, 1954 |

FOREIGN PATENTS

| | | |
|---|---|---|
| 216,538 | Great Britain | July 30, 1925 |